United States Patent [19]

Zurawski et al.

[11] Patent Number: 5,210,834
[45] Date of Patent: May 11, 1993

[54] HIGH SPEED TRANSFER OF INSTRUCTIONS FROM A MASTER TO A SLAVE PROCESSOR

[75] Inventors: John H. Zurawski, Stow; Walter A. Beach, Bedford, both of Mass.

[73] Assignee: Digital Equipment Corporation, Maynard, Mass.

[21] Appl. No.: 840,607

[22] Filed: Feb. 20, 1992

Related U.S. Application Data

[63] Continuation of Ser. No. 200,841, Jun. 1, 1988, abandoned.

[51] Int. Cl.⁵ .............................................. G06F 15/16
[52] U.S. Cl. .................................. 395/375; 395/800; 364/DIG. 1; 364/228; 364/228.6; 364/230.4; 364/231.8; 364/232.21; 364/261.3; 364/262.4; 364/263; 364/263.1; 364/265.265.3; 364/265.6
[58] Field of Search .................... 395/375, 800; 364/DIG. 1, DIG. 2, 200 MS File, 900 MS File, 132

[56] References Cited

U.S. PATENT DOCUMENTS

| | | | |
|---|---|---|---|
| 4,101,960 | 7/1978 | Stokes et al. | 364/200 |
| 4,172,287 | 10/1979 | Kawabe et al. | 364/200 |
| 4,270,167 | 5/1981 | Koehler et al. | 364/200 |
| 4,310,880 | 1/1982 | Gehman | 364/200 |
| 4,395,758 | 7/1983 | Helenius et al. | 364/200 |
| 4,435,758 | 3/1984 | Lorie et al. | 364/200 |
| 4,439,827 | 3/1984 | Wilkes | 364/200 |
| 4,500,959 | 2/1985 | Kubo et al. | 364/200 |
| 4,509,116 | 4/1985 | Lackey et al. | 364/200 |
| 4,541,046 | 9/1985 | Nagashima et al. | 364/200 |
| 4,547,849 | 10/1985 | Louie et al. | 364/200 |
| 4,578,750 | 3/1986 | Amdahl et al. | 364/200 |
| 4,613,935 | 9/1986 | Couleur | 364/200 |
| 4,617,625 | 10/1986 | Nagashima et al. | 364/200 |
| 4,641,275 | 2/1987 | Hatakeyama et al. | 364/900 |
| 4,648,034 | 3/1987 | Heninger | 364/200 |
| 4,656,581 | 4/1987 | Ohwada | 364/200 |
| 4,715,013 | 12/1987 | MacGregor et al. | 364/900 |
| 4,729,094 | 3/1988 | Zolnowsky et al. | 364/200 |
| 4,731,736 | 3/1988 | Mothersole et al. | 364/900 |
| 4,740,893 | 4/1988 | Buchholz et al. | 364/200 |
| 4,745,547 | 5/1988 | Buchholz et al. | 364/200 |
| 4,750,110 | 6/1988 | Mothersole et al. | 364/200 |
| 4,760,518 | 7/1988 | Potash et al. | 364/200 |
| 4,763,253 | 8/1988 | Bluhm et al. | 364/200 |
| 4,791,555 | 12/1988 | Garcia et al. | 364/200 |
| 4,803,620 | 2/1989 | Inagami et al. | 364/200 |
| 4,888,679 | 12/1989 | Fossum et al. | 364/200 |
| 4,890,220 | 12/1989 | Nakagawa et al. | 364/200 |
| 4,891,753 | 1/1990 | Budde et al. | 364/200 |
| 4,893,233 | 1/1990 | Denman et al. | 364/200 |
| 4,894,768 | 1/1990 | Iwasaki et al. | 364/200 |
| 4,903,264 | 2/1990 | Talgam et al. | 364/200 |
| 4,949,250 | 8/1990 | Bhandarkar et al. | 364/200 |
| 5,010,477 | 4/1991 | Omoda et al. | 395/800 |
| 5,029,073 | 7/1991 | Takaya et al. | 395/375 |
| 5,043,867 | 8/1991 | Bhandarkar et al. | 395/375 |
| 5,113,521 | 5/1992 | McKeen et al. | 395/650 |

*Primary Examiner*—Eddie P. Chan
*Assistant Examiner*—Matthew C. Fagan
*Attorney, Agent, or Firm*—Kenyon & Kenyon

[57] ABSTRACT

A master-slave processor interface protocol transfers a plurality of instructions from a master processor to a slave processor. Each instruction has an opcode and a set of operands. The interface includes a micro-engine which sends the opcode for each of the instructions to be executed to the slave processor and stores the opcode in a first buffer in the slave processor. A second micro-engine operates the master processor to fetch and process the set of operands for each of the instructions to be executed by the slave processor in the order of the opcode delivery to the first buffer. A third micro-engine delivers a signal to the slave processor when the master processor is ready to deliver the operands for an instruction. The opcode associated with the operands ready to be delivered is then moved from the first buffer to a second buffer upon receiving the signal from the master processor. The processed set of operands are then sent to the second buffer and the instruction is executed. Finally, any opcodes in the first buffer having a set of operands which were not delivered in their proper order are invalidated when a new opcode is sent to the first buffer. This allows pre-decoding to begin on the opcodes in the slave processor thus reducing the overhead of the instruction execution.

40 Claims, 3 Drawing Sheets

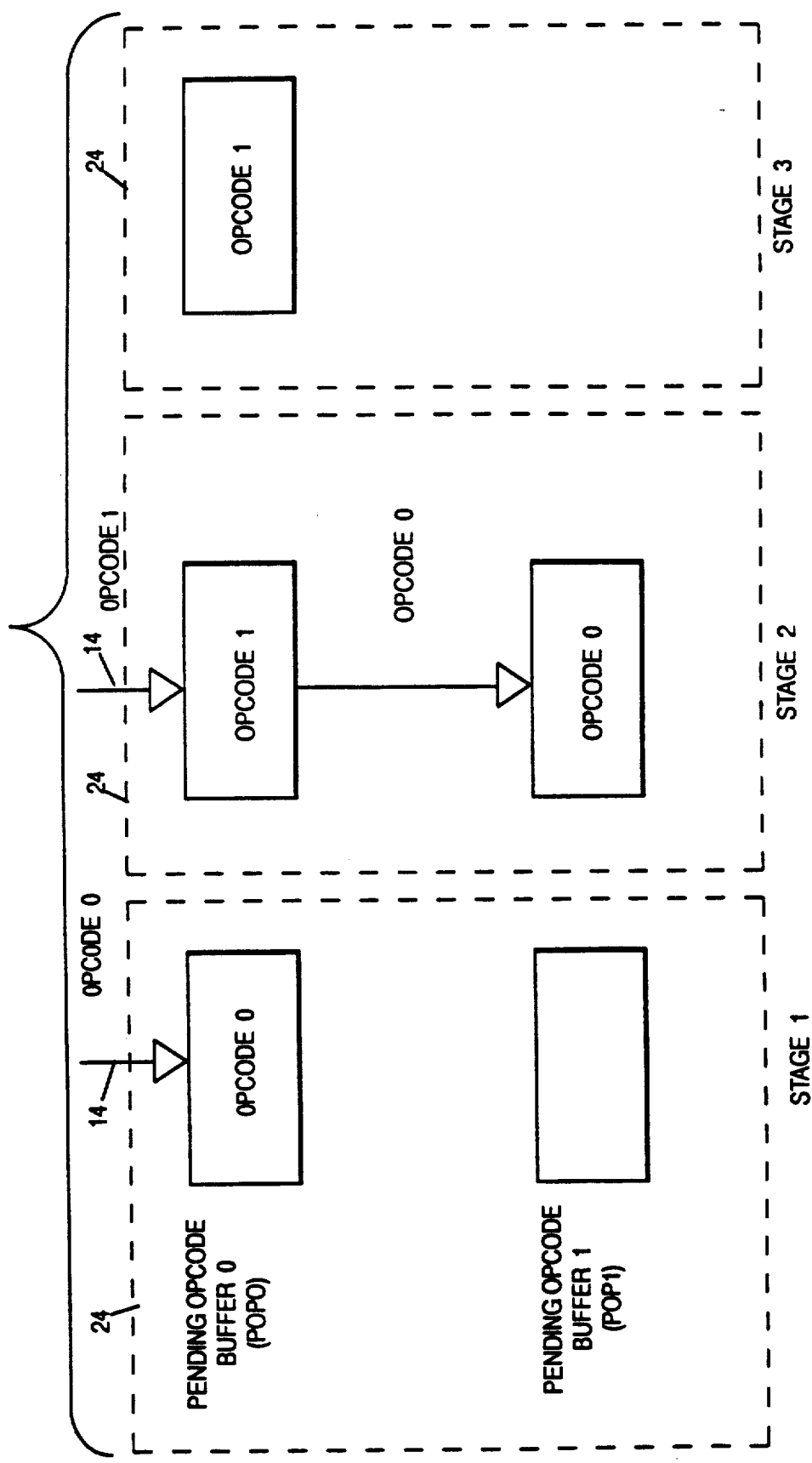

HIGH SPEED TRANSFER OF INSTRUCTIONS FROM A MASTER TO A SLAVE PROCESSOR

This is a continuation of application Ser. No. 200,841, filed Jun. 1, 1988, entitled HIGH SPEED TRANSFER OF INSTRUCTIONS FROM A MASTER TO A SLAVE PROCESSOR, now abandoned.

FIELD OF THE INVENTION

This invention relates to a protocol for use in a computer system and, more particularly, to an instruction issue protocol between a master and a slave processor.

BACKGROUND OF THE INVENTION

Pipelined processor designs typically incorporate master-slave processor configurations. The master processor issues an instruction to be performed by the slave processor. The instruction must therefore be transferred to the slave processor before it can be executed. The transfer of instructions from the master processor to the slave processor is complicated by traps and stalls which may occur in the master processor.

A problem occurs in a heavily pipelined master-slave processor system when the master processor issues an instruction to the slave processor before all of the exceptions i.e. traps, stalls, etc., that may affect the execution of the instruction are known to the master processor. This problem is encountered in a scalar-vector processor where vector instructions comprised of an opcode and a set of operands must be delivered from the scalar to the vector processor. The scalar or master processor tries to deliver both the command i.e. opcode, and the set of operands to the vector or slave processor for each vector instruction as quickly as possible. However, due to the fact that exceptions may occur during the scalar unit's fetching of the operands, the vector unit cannot begin to process the instruction.

One prior solution to the above problem has been to delay the issuing of the instruction from the master processor until the instruction is known to be free from exceptions. However, the performance of the system is degraded due to the delay introduced by having the vector processor perform the pre-decoding of the instruction only after the instruction has been completely transferred.

An alternative solution has been to allow the slave or vector processor to immediately begin executing the instruction. In order to function properly, the slave processor must therefore include complex trap and stall mechanisms. The trap and stall mechanisms are required in the slave processor in order to allow the instruction in progress to be aborted before any state of the slave processor is altered by the execution of the instruction.

SUMMARY OF THE INVENTION

The present invention overcomes the above problems through the use of a novel instruction issue protocol between the scalar processor and the vector processor. The vector instructions comprise both an opcode and a set of operands. The protocol allows the scalar processor to send the opcode for the vector instruction to the vector processor as soon as the instruction is issued. In a pipelined system, instruction execution is overlapped. Therefore, a pipelined system has the potential to issue an opcode to the vector processor on every cycle. The opcodes are delivered to the vector processor while there still may be exceptions that will affect the execution of the vector instruction. The vector processor includes a pending opcode buffer which stores the vector instruction opcodes. The vector processor can begin pre-decoding the opcodes once they are in the pending opcode buffer.

The set of operands for each opcode of the vector instruction is processed by the scalar processor. The scalar processor fetches and processes the operands for each of the opcodes in the order of their delivery to the vector processor. Once all of the operands for a vector instruction are ready to be sent to the vector processor, a micro-engine in the scalar processor begins the delivery. At this time, the vector instruction associated with the operands is free from any exceptions.

The instruction issue protocol includes both pending and valid opcodes. A pending opcode is an opcode that has been received by the vector processor but has not had any of its associated operands delivered. A valid opcode is essentially a complete instruction i.e. opcode and a set of operands. A valid opcode is ready to be executed by the vector processor.

Because the protocol requires the scalar processor to process the operands for each of the opcodes in the order of the opcodes' delivery to the vector processor, only one valid opcode can be pending in the vector processor at a time. The micro-engine in the scalar processor that delivers the operands to the vector processor signals the vector processor that it is ready to start delivery of the operands. This signal instructs the vector processor to move the newest pending opcode from the pending opcode buffer to a vector instruction buffer. Any other pending opcodes are flushed from the pending opcode buffer. In this way, when an exception occurs between the time when an earlier opcode was delivered and when the operands for that opcode should have been ready for delivery, that opcode will be ignored by the vector processor. Only a single opcode is moved to the vector instruction buffer due to the fact tat the vector processor is a single command vector unit which can operate only on one command at a time.

It is an advantage of the present invention to eliminate the constraint of having to simultaneously deliver both the opcode and operands from the scalar processor to the vector processor. The use of the pending opcode buffer in the vector processor allows the opcode to be pre-decoded as soon as the vector instruction has been issued. Further, the operands that are fetched by the scalar processor are delivered together to the vector processor once all exceptions are accounted for by the scalar processor. This allows the vector processor to begin pre-decoding the opcode which reduces the overhead time of the vector processor.

It is a further advantage to increase the operating speed performance of the instruction transfer. Further, the use of this protocol allows for fast instruction delivery while avoiding costly and complex trap and stall logic overhead on the vector processor. Once the operands are ready for delivery from the scalar processor, the vector processor moves the pending opcode to a vector instruction buffer. The scalar processor then transfers the operands and the vector processor executes the instruction which is in the vector instruction buffer. The vector processor can immediately begin executing the vector instruction as the setup time for the vector processor is eliminated by pre-decoding the opcode. Further, because the protocol insures that the instruction associated with the operands is free from any exceptions, complex trap and stall logic is not necessary on the vector processor.

DESCRIPTION OF THE DRAWINGS

FIG. 3 shows the operation of the pending opcode buffer of the present invention.

DETAILED DESCRIPTION

Figure 1:
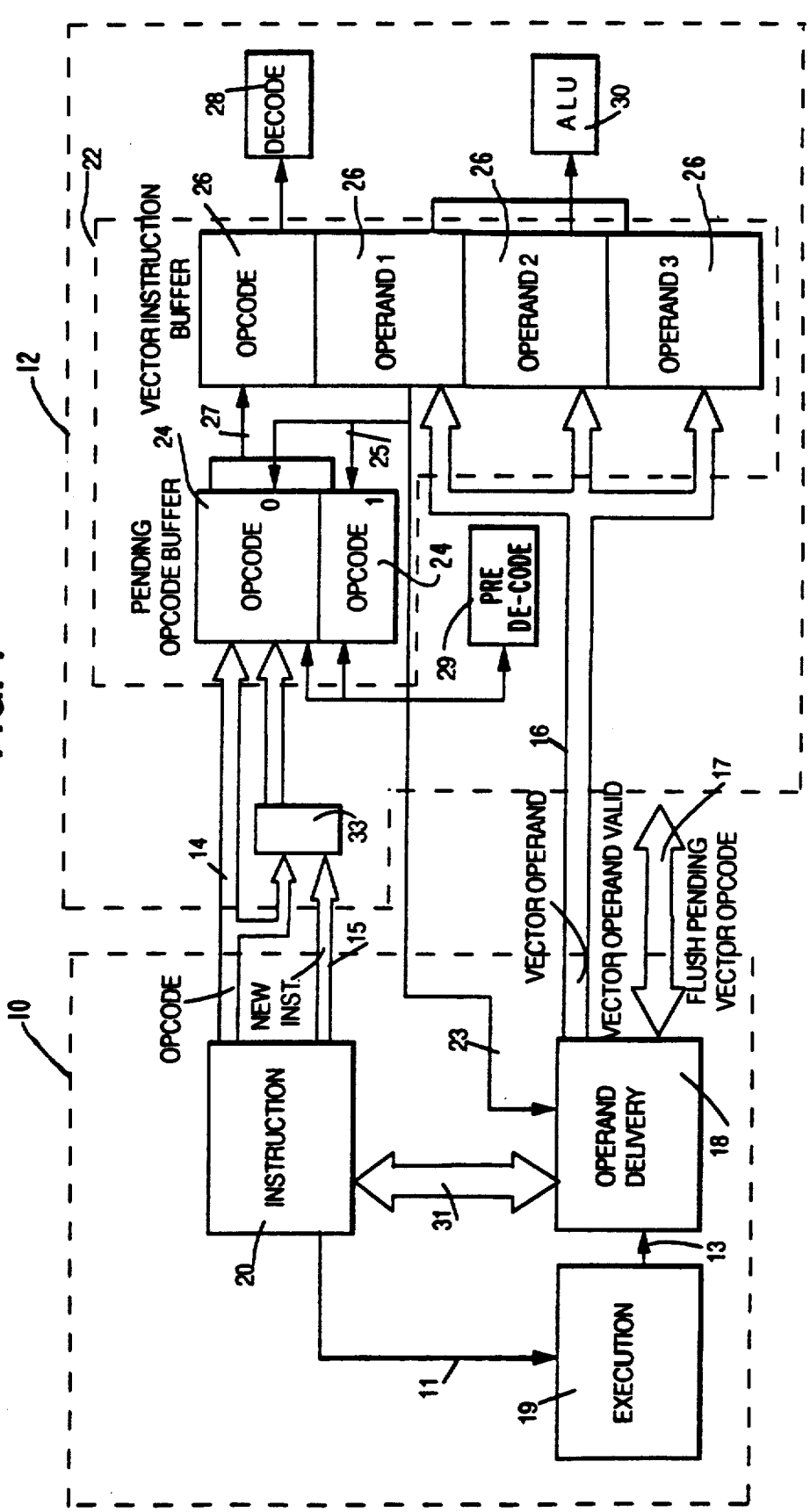
FIG. 1 shows a block diagram of the processors of the present invention.

Referring to FIG. 1, there is shown a block diagram of the master-slave processor system of the present invention. For purposes of this description, the master-slave processor system comprises a scalar central processing unit (CPU) 10 and a vector processor 12, respectively. The master or scalar processor 10 runs a program in the system. An instruction micro-engine 20 operates in the scalar processor 10. Each instruction is divided into an opcode and a set of operands. The instruction micro-engine 20 fetches the instruction opcodes and issue controls to various elements in the scalar and vector processors. An execution micro-engine 19 processes the operands for the opcode received from the instruction micro-engine on line 11. An operand delivery micro-engine 18 delivers the operands, associated with the instruction from the execution micro-engine 19 on line 13, to the vector processor 12 as shown by path 16. Operand delivery micro-engine 18 also sends control signals to the vector processor 12 as shown by control path 17 and receives the opcode from the instruction micro-engine 20 as shown by path 31.

The vector processor 12 includes an instruction block, indicated generally by dotted line 22, and a vector opcode decoder block 33. The instruction block 22 comprises a pending opcode buffer 24 and a vector instruction buffer 26. A pre-decoder 29 is coupled to the pending opcode buffer 24. The pending opcode buffer 24 receives opcodes from the instruction micro-engine 20 of the scalar processor 10 as shown by path 14. The vector opcode decoder 33 receives opcodes and instruction signals (NEW INSTRUCTION) from the instruction micro-engine 20 of the scalar processor 10 as shown by paths 14 and 15. The number of instruction opcodes that can be delivered depends upon the depth of the pending opcode buffer 24 as well as the length of the pipelined system. FIG. 1 illustrates a two-deep buffer having opcode buffer slots 0 and 1.

A signal path 25, 23 is coupled to the pending opcode buffer 24 and to the operand delivery micro-engine 18 from the vector instruction buffer 26. Another path 27 allows the vector instruction buffer 26 to receive an opcode from the pending opcode buffer 24. Further, the vector instruction buffer 26 receives the set of operands for that instruction opcode from the operand delivery micro-engine 18 of the scalar processor 10 as shown by path 16. The vector instruction buffer 26 couples the opcode to a decoder 28 and the set of operands to an arithmetic logic unit (ALU) 30. FIG. 1 illustrates a one instruction deep buffer holding an opcode and a set of three operands.

In operation, a high speed transfer of vector instructions is executed between heavily pipelined processors 10 and 12. The vector processor 12 receives vector instruction opcodes from the instruction micro-engine 20 operating in the scalar processor 10. The vector opcode decoder 33 determines whether the instruction opcode is a vector instruction. If the opcode is a vector instruction opcode, then the decoder 33 signals (NEW VECTOR INSTRUCTION) the pending opcode buffer 24 to accept the opcode. The set of operands for each of the vector instruction opcodes are processed by the execution micro-engine 19 and then sent to registers located in the operand delivery micro-engine 18. The operand delivery micro-engine 18 forwards the operands to the vector processor as shown by path 16. The instruction micro-engine checks with the operand delivery micro-engine on control path 31 to determine whether a set of operands has been delivered for any previous opcode. The instruction micro-engine 20 delays the transfer of any further opcodes, once the pending opcode buffer is full, until the operand delivery micro-engine 18 has sent a set of operands thus opening a buffer slot in the pending opcode buffer 24.

Once the operands are delivered, the vector processor 12 has all of the necessary information to begin executing the vector instruction. By channeling most of the interface signals between the two processors through the operand delivery micro-engine 18, the vector processor 12 is insulated from scalar exceptions as will be described below.

When a program is running in the scalar processor 10, the instruction micro-engine 20 generates the opcodes for the instructions. The instruction micro-engine 20 asserts a NEW INSTRUCTION signal on control path 15 to a vector opcode decoder 33 in the vector processor 12 for each instruction. The vector opcode decoder 33 determines whether the opcode for the new instruction is a vector instruction. If the opcode is for a vector instruction, the decoder 33 asserts a NEW VECTOR INSTRUCTION signal to the pending opcode buffer 24. The NEW VECTOR INSTRUCTION signal instructs the pending opcode buffer 24 to accept the opcode. The NEW VECTOR INSTRUCTION signal, further, indicates to the vector processor 12 that the execution of a vector instruction has started in the scalar processor 10.

After receiving the NEW VECTOR INSTRUCTION signal, the vector processor 12 samples the opcode generated on path 14. The vector processor 12 stores the opcode from the instruction micro-engine 20 in the pending opcode buffer 24. In a certain embodiment illustrated in FIG. 1, the pending opcode buffer 24 is a two-deep buffer as indicated by opcode buffer slots 0 and 1. Up to two opcodes may therefore be received by the vector processor 12 before the set of operands associated with the vector instruction opcodes begin to arrive in the vector processor 12.

The opcode from the instruction micro-engine 20 is also delivered to the operand delivery micro-engine 18 on control path 31. Further, the instruction micro-engine signals the execution micro-engine to begin fetching the operands for that opcode as shown by line 11. The operand delivery micro-engine 18 determines whether there are any other valid opcodes that are awaiting operand delivery. If the are not, then the operand delivery micro-engine 18 sends a FLUSH PENDING VECTOR OPCODE signal to the vector processor 12 as shown by control path 17. This signal instructs the vector processor 12 to ignore any opcode in the pending opcode buffer 24 older than the just received opcode. The FLUSH PENDING VECTOR OPCODE signal is sent regardless of whether there are any other opcodes pending in the pending opcode buffer 24. However, if there are valid opcodes awaiting their operands, the FLUSH PENDING VECTOR OPCODE is not sent and the instructions are processed in order.

An example of when the FLUSH PENDING VECTOR OPCODE signal will be sent occurs when:

1) A valid opcode is initially delivered to both the pending opcode buffer 24 and the operand delivery micro-engine 18; and 2) The operand delivery micro-engine 18 encounters a non-serviceable exception i.e. a macro-branch exception for the initially valid opcode; and.

3) A second opcode is delivered to the operand delivery micro-engine 18 and the pending opcode buffer 24.

Upon receipt of the second opcode, the operand delivery micro-engine 18 will assert the FLUSH PENDING VECTOR OPCODE signal because it recognizes that the previous opcode is now invalid due to the non-serviceable exception.

Continuing the operation, the scalar processor's execution micro-engine 19 and operand delivery micro-engine 18 process the operands for each of the opcodes in the order the opcodes are delivered to the vector processor 12. Therefore, when the operands begin arriving, they first satisfy the oldest pending opcode. However, it is possible that the operands for an opcode will never be sent due to an exception which occurs in the scalar processor 10. Micro-engine 18 is responsible for indicating to the vector processor 12 when the operands for a pending vector opcode will not be sent as described above.

Once an opcode has been delivered to the vector processor 12 and is stored in the pending opcode buffer 24, a pre-decoder 29 begins setting up the vector processor 12 to perform the instruction's operation. The pre-decoding of the opcode continues until the vector processor 12 either completes the pre-decoding or is signaled that the operands are ready to be delivered.

The scalar processor 10 fetches the operands from memory. The execution micro-engine 19 in the scalar processor 10 decodes the operands and forwards them to operand delivery micro-engine 18. The operand delivery micro-engine 18 delivers the operands to the instruction buffer 26 of the vector processor 12 as shown by path 16. However, the operand delivery micro-engine 18 does not deliver the operands to the vector processor 12 until the operands are free from all exceptions that may have occurred during the obtaining and decoding of the operands in the scalar processor 10. Because of this, the vector instruction associated with the operands is guaranteed to be free of exceptions. As soon as the operands are cleared of exceptions, the operand delivery micro-engine 18 asserts a VECTOR OPERAND VALID signal to the vector processor on control path 17 indicating that delivery will begin. This signal instructs the vector processor to accept the VECTOR OPERANDS that are delivered on path 16.

The operand delivery micro-engine 18 sends the full set of operands in consecutive clock cycles. Once the vector instruction buffer 26 has received its first operand, the VECTOR INSTRUCTION FULL BUFFER (VECTOR IB FULL) signal is asserted. This signal is sent to both the pending opcode buffer 24 and to the operand delivery micro-engine 18. The VECTOR IB FULL signal is a valid bit associated with the first operand for each instruction. The valid bit instructs logic in the pending opcode buffer 24 to move the oldest pending opcode to the vector instruction buffer 26 as shown by lines 25 and 27 thus indicating that it is a valid opcode. Further, the VECTOR IB FULL signal instructs the operand delivery micro-engine 18 not to send any subsequent instructions' operands. Operand delivery micro-engine 18 will only send new operands when the VECTOR IB FULL signal is deasserted. The complete instruction stored in the vector instruction buffer 26 is delivered to a vector decoder 28 and a vector arithmetic logic unit 30 which executes the instruction.

Figure 2:
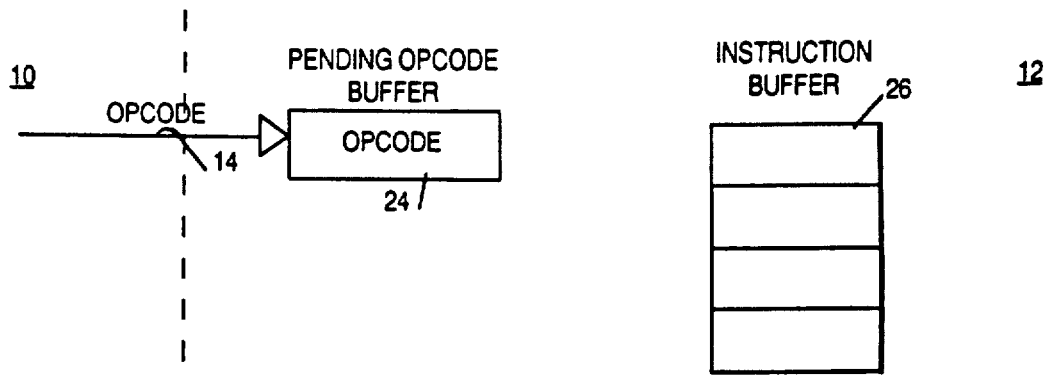
FIGS. 2, 2A, 2B, and 2C illustrate the transfer of an opcode and a set of operands between the processors of FIG. 1.
Figure 2A:
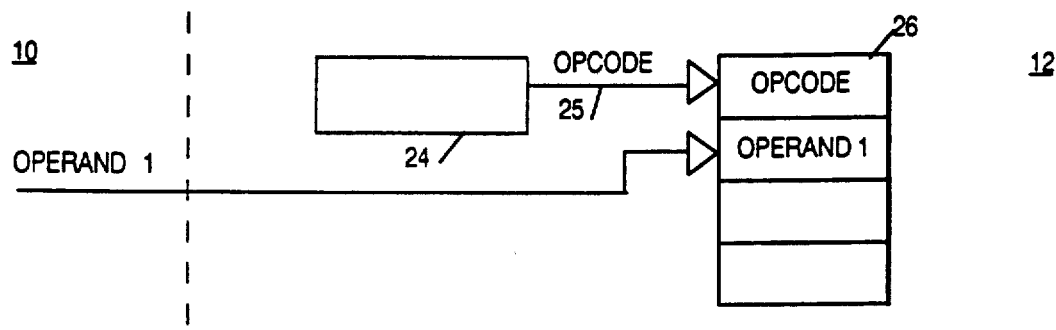
Figure 2B:
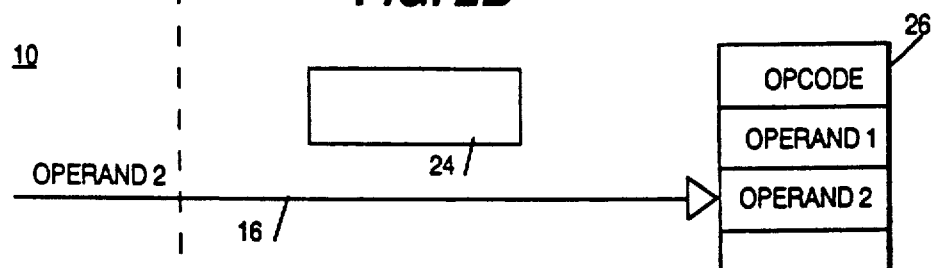
Figure 2C:
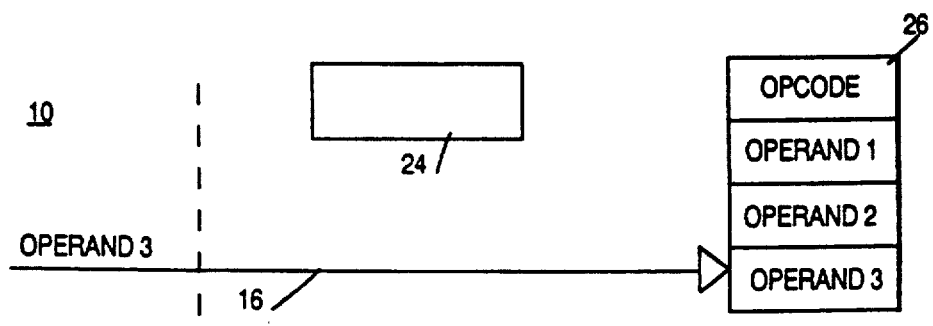

FIGS. 2-2C illustrate the sequence of events involved in sending a vector instruction from the scalar processor 10 to the vector processor 12 to load the vector instruction buffer 26. First, the scalar processor 10 sends a vector instruction opcode to the pending opcode buffer 24 of the vector processor 12 as shown by line 14. Next, the scalar processor 10 delivers the operands associated with the opcode which was forwarded to the pending opcode buffer. As shown from FIG. 2A, when the first operand is delivered from the scalar processor 10, the vector processor 12 moves the pending opcode from the pending opcode buffer 24 into the vector instruction buffer 26. In the figures, the vector instruction buffer is a one instruction deep buffer holding an opcode and three operands. The exact size of the vector instruction buffer can vary. Further, the number of operands necessary to execute each instruction opcode can vary depending upon the opcode. However, in this embodiment, the scalar processor 10 will always send a full set of operands to the vector instruction buffer as a means to simplify the interface between the processors. The operands are delivered in a consistent order from the scalar processor 10 an example of which is shown in FIGS. 2A-2C.

Referring back to FIG. 1, when the vector instruction buffer 26 is filled, the vector processor asserts a VECTOR IB FULL signal to the operand delivery micro-engine 18 on control path 17. This signal indicates to the operand delivery micro-engine 18 that the operands for the next pending opcode cannot be accepted at the present time. The operand delivery micro-engine 18, therefore, holds the operands for the next pending opcode until the vector instruction buffer 26 is emptied by the vector processor 12. In effect, this provides a two-deep instruction buffer. The vector processor holds one complete instruction in the vector instruction buffer 26 and operand delivery micro-engine 18 holds the operands for the next vector instruction in the scalar processor 10.

Due to the latency of any scalar exceptions which may occur in the scalar processor 10, it is possible for the vector processor 12 to have received opcodes that should not be executed. As an example of how this may occur, the instruction micro-engine 20 may begin sending opcodes from a wrong path during a scalar processor macro-branch instruction before discovering the outcome of the macro branch. The protocol implemented, however, guarantees that micro-engine 18 will not send any operands for an opcode until it is certain that the instruction can be executed. Therefore, any invalid opcodes are constrained in the pending opcode buffer 24 of the vector processor 12. FIG. 3 shows the operation of the pending opcode buffer 24 when an invalid opcode is received i.e. an opcode which will never have its operands delivered to the vector processor 12.

Referring to FIG. 3, there is shown how the pending opcode buffer 24 operates to prevent an invalid vector instruction from being executed. As described above, it is possible for an invalid opcode to be sent by the instruction micro-engine 20 to the pending opcode buffer 24. The invalid opcode (OPCODE 0) will be stored in the pending opcode buffer slot 0 as shown by stage 1. Because this opcode is invalid due to some exception in the scalar processor, no operands will ever be sent to the instruction buffer. After the exception is serviced in the scalar processor 10 and when another vector instruction is issued, a new opcode (OPCODE 1) will be delivered from the instruction micro-engine 20. The valid opcode (OPCODE 1) moves the older opcode (OPCODE 0), which the vector processor still believes is valid, to pending opcode buffer slot 1 as shown by stage 2. The new opcode (OPCODE 1) is placed in pending opcode buffer slot 0. Once the operand delivery micro-engine 18 in the scalar processor 10 has received the opcode on line 25 from the instruction micro-engine 20, a control signal (FLUSH PENDING VECTOR OPCODE) is asserted to the vector processor 12 indicating that only the last opcode (OPCODE 1) received is valid. This signal is asserted because the operand delivery micro-engine 18 has only one valid opcode (OPCODE 1) since the first opcode (OPCODE 0) encountered a non-serviceable exception. The FLUSH PENDING VECTOR OPCODE signal instructs the vector processor 12 to flush the pending opcode buffer after the valid opcode is moved to the vector instruction buffer 26. Therefore, all older pending opcodes are discarded.

The above described operation increases the performance of the master-slave processor system by allowing pre-decoding of the commands in the vector processor. If the scalar processor 10 encounters a serviceable exception such as a cache miss or translation buffer miss while fetching the operands for a given vector instruction, then the micro-engine 18 does not deliver the operands to the vector processor 12. However, after the scalar processor 10 corrects any errors that occurred, the operands for the instruction are delivered to the vector processor's vector instruction buffer 26. If the scalar processor 10 encounters a non-serviceable exception such as a macro-branch, then the operand delivery micro-engine 18 will never deliver the associated operands. Instead, the next instruction opcode which is sent to the pending opcode buffer 24 and the operand delivery micro-engine 18 is recognized as the only valid opcode. Therefore, a control signal is sent from the operand delivery micro-engine 18 to the vector processor to only recognize the newest valid opcode in the pending opcode buffer 24. The pending invalid opcodes result from the non-serviceable exception that occurred in the scalar fetching of the operands for that vector instruction between the time when the opcode was delivered and when the operands should have been ready for delivery.

In this manner, only valid operands are delivered to the vector instruction buffer 26. Further, the vector overhead time is reduced as pre-decoding can begin as soon as the opcode is delivered. The use of this protocol allows for fast instruction delivery while avoiding the overhead of trap and stall logic on the vector processor. The vector processor does not begin execution of the vector instruction until there are no exceptions, therefore, complex trap and stall mechanisms are not necessary to abort the progress of the instruction before any state of the vector processor is altered by the execution of the instruction.

By moving the valid pending opcode to the vector instruction buffer 26, the vector processor 12 frees its pending opcode buffer 24 to receive another instruction which may be pre-decoded. Thus, although the vector processor is a single command vector unit, some of the vector overhead associated with the subsequent vector instruction in the pending opcode buffer can be started while the vector processor is still running the previous vector instruction. Again, this speeds up the performance of the vector processor.

What is claimed is:

1. A first device which is coupled to and receives a plurality of instructions from a second device, said instructions each having an opcode and a set of operands, the first device comprising:
    a) a first buffer to store each of the opcodes;
    b) means for moving one of the opcodes from the first buffer to a second buffer when a fist operand in the set of operands associated with the one of the opcodes is delivered to the first device from the second device indicating that the set of operands is valid;
    c) means for receiving the set of operands from the second device and executing each of the instructions,
    d) means for receiving a signal from the second device which indicates whether a set of operands is invalid; and
    e) means for invalidating any opcodes in the first buffer having a set of operands which are identified as invalid by said means for receiving a signal.

2. A first device according to claim 1, further comprising means for predecoding the opcode in the first buffer, while awaiting a delivery of the set of operands from the second device, said means for predecoding coupled to the first buffer.

3. A first device according to claim 2 wherein said first device is a vector processor.

4. A first device according to claim 3 wherein said first buffer is a two opcode deep buffer.

5. A first device according to claim 4 wherein said second buffer is a one instruction deep buffer holding an opcode and a set of three operands.

6. A method for operating a computer system to transfer a plurality of instructions from a scalar processor coupled to a vector processor, the instructions each having an opcode and a set of operands, the method comprising the steps of:
    a) sending the opcode for each of the instructions to be executed from the scalar processor to the vector processor, the step of sending the opcode further comprising the step of operating a first micro-engine in the scalar processor to send a new instruction signal and the opcode to a vector opcode decoder and determining by the vector opcode decoder whether the opcode is for a vector instruction, the vector opcode decoder then issuing a new vector instruction signal to the vector processor when the opcode is for a vector instruction, the new vector instruction signal instructing the vector processor to read the opcode from the scalar processor;
    b) storing the opcode in a first buffer in the vector processor;
    c) operating the scalar processor to fetch, from a source of operands, process, and validate the set of operands associated with each opcode sent to the first buffer for each of the instructions to be executed by the vector processor;

d) delivering a signal from the scalar processor to the vector processor indicating the scalar processor is ready to deliver a processed set of operands for an instruction;

e) delivering the processed set of operands associated with the opcode sent to the first buffer to a second buffer in the vector processor;

f) moving the opcode, associated with the processed set of operands, from the first buffer to the second buffer upon receiving a first operand in the processed set of operands from the scalar processor; and g) invalidating any opcodes in the first buffer having an associated set of operands which, when fetched and processed by the scalar processor, are determined to be invalid.

7. A method for operating a computer system to transfer a plurality of instructions from a scalar processor to a vector processor, with the scalar processor being coupled to the vector processor, the instructions each having an opcode and a set of operands, the method comprising the steps of:

a) sending the opcode for each of the instructions to be executed from the scalar processor to the vector processor and storing the opcodes in a first buffer in the vector processor wherein the step of sending the opcode further comprises the step of:

operating a first micro-engine in the scalar processor to send a new instruction signal and the opcode to a vector opcode decoder and determining by the vector opcode decoder whether the opcode is for a vector instruction, said vector opcode decoder then issuing a new vector instruction signal to the vector processor when the opcode is for a vector instruction, the new vector instruction signal instructing the vector processor to read the opcode from the scalar processor;

b) operating the scalar processor to sequentially fetch, from a source of operands, and process the set of operands associated with each opcode sent to the first buffer for each of the instructions to be executed by the vector processor;

c) pre-decoding the opcodes in the first buffer in the vector processor while awaiting a delivery of the associated processed set of operands from the scalar processor;

d) determining the validity of each of the set of operands;

e) delivering each valid processed set of operands to the vector processor;

f) discarding each opcode in the first buffer whose associated set of operands is not valid;

g) forming each of the plurality of instructions from each opcode in the first buffer and its associated set of operands; and h) executing each of the plurality of instructions.

8. A method according to claim 7 wherein the step of operating the scalar processor is carried out by a second micro-engine in the scalar processor.

9. A method according to claim 8 wherein the step of delivering each valid processed set of operands is preceded by the step of delivering a signal to the vector processor from a third micro-engine in the scalar processor, the signal indicating the scalar processor is ready to deliver the processed set of operands.

10. A method for operating a computer system to transfer a plurality of instructions from a master processor coupled to a slave processor, said instructions each having an opcode and a set of operands, the method comprising the steps of:

a) sending the opcode for each of the instructions to be executed from the master processor to the slave processor and storing the opcode in a first buffer in the slave processor;

b) operating the master processor to fetch, from a source of operands, and to process a set of operands for each opcode sent to the first buffer for each of the instructions to be executed by the slave processor;

c) determining whether an exception has occurred during the fetching and processing of the set of operands associated with each opcode sent to the first buffer;

d) delivering a signal from the master processor to the slave processor indicating the master processor is ready to deliver a processed set of operands for an instruction;

e) delivering the processed set of operands for each opcode sent to the first buffer, to a second buffer in the slave processor;

f) moving the opcode, associated with the processed set of operands, from the first buffer to the second buffer upon receiving the processed set of operands from the master processor; and g) invalidating any opcodes in the first buffer having an associated set of operands which are being fetched and processed by the master processor when an exception occurs.

11. A method according to claim 10 wherein the step of moving the opcode is performed upon receiving a first operand in the processed set of operands from the master processor.

12. A method according to claim 11 wherein the master processor is a scalar processor and the slave processor is a vector processor.

13. A method according to claim 12 wherein the step of sending the opcode further comprises the step of:

operating a first micro-engine in the scalar processor to send a new instruction signal and the opcode to a vector opcode decoder and determining by the vector opcode decoder whether the opcode is for a vector instruction, said vector opcode decoder issuing a new vector instruction signal to the vector processor when the opcode is for a vector instruction, the new vector instruction signal instructing the vector processor to read the opcode from the scalar processor.

14. A method according to claim 13 wherein the step of operating the master processor is carried out by a second micro-engine in the master processor.

15. A method according to claim 14 wherein the steps of delivering a signal and determining the occurrence of an exception are carried out by a third micro-engine in the master processor.

16. A method according to claim 15 wherein the step of moving the opcode further comprises the steps of:

i) checking whether the first operand is valid in the second buffer; and ii) sending a valid signal from the second buffer when the first operand is valid to select and move to the second buffer the opcode associated with the processed set of operands.

17. A method according to claim 16 wherein the step of invalidating any opcodes further comprises the steps of:
   i. sending the opcode from the first micro-engine to the third micro-engine and receiving the opcode in the third micro-engine;
   ii. determining whether any other opcodes are present in the third micro-engine and whether any one of the other opcodes is invalid; and
   iii. sending a flush signal to the vector processor when any one of the other opcodes is invalid.

18. A method according to claim 17 wherein the step of determining whether any one of the other opcodes is invalid is carried out by the third micro-engine.

19. A master-slave processor interface for transferring a plurality of instructions from a master processor coupled to a slave processor, said instructions each having an opcode and a set of operands, the interface comprising:
   a) a first micro-engine in the master processor for sending the opcode for each of the instructions to be executed from the master processor to the slave processor and means for storing each opcode in a first buffer in the slave processor, the first buffer comprising a two opcode deep buffer;
   b) a second micro-engine in the master processor for operating the master processor to fetch, from a source of operands, and to process a set of operands associated with each opcode sent to the first buffer for each of the instructions to be executed by the slave processor;
   c) means for pre-decoding the opcodes in the first buffer by the slave processor while awaiting delivery of the processed sets of operands from the master processor;
   d) a third micro-engine in the master processor for determining the validity of each set of operands, for delivering a first signal from the master processor to the slave processor indicating the master processor is ready to deliver a valid processed set of operands, for delivering a second signal from the master processor to the slave processor directing the slave processor to discard each opcode whose associated set of operands is not valid; and
   e) means for delivering the valid processed set of operands to the slave processor, discarding each opcode in the first buffer which is not valid, and executing each of the instructions.

20. A master-slave interface according to claim 19 wherein the interface further comprises a second buffer in the slave processor coupled to the first buffer and to the means for delivering the valid processed set of operands, the second buffer functioning to hold the opcode and a processed set of three operands associated therewith.

21. A scalar-vector processor interface for transferring a plurality of instructions from a scalar processor coupled to a vector processor, the instructions each having an opcode and a set of operands, the interface comprising:
   a) a first micro-engine, in the scalar processor, for sending the opcode for each of the instructions to be executed from the scalar processor to the vector processor and means, in the vector processor, for storing each opcode in a first buffer in the vector processor;
   b) a second micro-engine, in the scalar processor, for operating the scalar processor to fetch, from a source of operands, and process a set of operands associated with each opcode sent to the first buffer for each of the instructions to be executed by the vector processor;
   c) a third micro-engine, in the scalar processor, for determining the validity of a set of operands associated with each opcode sent to the first buffer for each of the instructions to be executed by the vector processor, and, for delivering a signal from the scalar processor to the vector processor indicating the scalar processor is ready to deliver a valid processed set of operands for an instruction;
   d) means, in the scalar processor, for delivering the valid processed set of operands associated with each opcode sent to the first buffer to a second buffer in the vector processor;
   e) means, in the vector processor, for moving the opcode, associated with the valid processed set of operands, from the first buffer to the second buffer upon receiving a first operand in the valid processed set of operands from the scalar processor; and
   f) means for invalidating any opcodes in the first buffer having an associated set of operands which, when fetched and processed by the scalar processor, are determined to be invalid.

22. A master-slave processor interface for transferring a plurality of instructions from a master processor coupled to a slave processor, the instructions each having an opcode and a set of operands, the interface comprising:
   a) means, in the master processor, for sending the opcode for each of the instructions to be executed from the master processor to the slave processor and means, in the slave processor, for storing the opcode in a first buffer in the slave processor;
   b) means, in the master processor, for operating the master processor to fetch, from a source of operands, and process a set of operands associated with each opcode sent to the first buffer for each of the instructions to be executed by the slave processor;
   c) means, in the master processor, for determining whether an exception has occurred during the fetching and processing of each of the set of operands associated with each opcode stored in the first buffer;
   d) means, in the master processor, for delivering a signal from the master processor to the slave processor indicating the master processor is ready to deliver a processed set of operands for an instruction;
   e) means, in the master processor, for delivering the processed set of operands associated with each opcode sent to the first buffer to a second buffer, in the slave processor;
   f) means, in the slave processor, for moving the opcode, associated with the processed set of operands, from the first buffer to the second buffer upon receiving the processed set of operands from the master processor; and
   g) means, in the master processor, for invalidating any opcodes in the first buffer having an associated set of operands which are being fetched and processed by the master processor when an exception occurs.

23. A master-slave interface according to claim 22 wherein the means for moving the opcode operates upon receiving the first operand in the associated processed set of operands from the master processor.

24. A master-slave interface according to claim 23 wherein the master processor is a scalar processor and the slave processor is a vector processor.

25. A master-slave interface according to claim 24 wherein the means for sending the opcode is a first micro-engine in the master processor.

26. A master-slave interface according to claim 25 wherein the means for operating the master processor is a second micro-engine in the master processor.

27. A master-slave interface according to claim 26 wherein the means for delivering a signal is a third micro-engine in the master processor.

28. A master-slave interface according to claim 27 wherein the means for moving the opcode, further comprises:
   i) means for checking whether the first operand is valid in the second buffer; and
   ii) means for sending a valid signal from the second buffer to the first buffer when the first operand is valid to select and move to the second buffer the opcode associated with the processed set of operands.

29. A master-slave interface according to claim 28 wherein the means for invalidating any opcodes, further comprises:
   i) means for receiving the opcode from the first micro-engine in the third micro-engine;
   ii) means for determining whether any other opcodes are present in the third micro-engine and whether any one of the other opcodes is invalid; and
   iii) means for sending a flush signal to the vector processor if the any one of the other opcodes is invalid.

30. A master-slave interface according to claim 29 wherein the means for determining whether any one of the other opcodes is invalid is carried out by the third micro-engine.

31. A master-slave interface according to claim 30 wherein the first buffer is a two opcode deep buffer.

32. A master-slave interface according to claim 31 wherein the second buffer is a one instruction deep buffer holding an opcode and a set of three operands.

33. A computer system, comprising:
   a) a master processor for transferring a plurality of instructions, the instructions each having an opcode and a set of operands;
   b) a slave processor, coupled to the master processor, for receiving and executing the plurality of instructions;
   c) means, in the master processor, for sending the opcode for each of the instructions to be executed from the master processor to the slave processor and means, in the slave processor, for storing the opcode in a first buffer in the slave processor;
   d) means, in the master processor, for operating the master processor to fetch, from a source of operands, and to process a set of operands associated with each opcode sent to the first buffer for each of the instructions to be executed by the slave processor;
   e) means, coupled to the first buffer, for pre-decoding the opcodes in the first buffer by the slave processor while awaiting a delivery of the processed set of operands from the master processor;
   f) means, in the master processor, for determining whether an exception occurred during the fetching and processing of the set of operands;
   g) means, in the master processor, for delivering a signal from the master processor to the slave processor indicating the master processor is ready to deliver a processed set of operands for an instruction;
   h) means, in the master processor, for delivering a processed set of operands to a second buffer in the slave processor;
   i) means, in the slave processor, for moving the opcode associated with each processed set of operands from the first buffer to the second buffer upon receiving the processed sets of operands from the master processor; and
   j) means, in the master processor, for invalidating any opcodes in the first buffer having an associated set of operands which are being fetched and processed by the master processor when an exception occurs.

34. A computer system according to claim 33 wherein the means for moving the opcode operates upon receiving a first operand in a set of operands from the master processor.

35. A computer system according to claim 34 wherein the master processor is a scalar processor and the slave processor is a vector processor.

36. A computer system according to claim 35 wherein the means for sending the opcode is a first micro-engine in the master processor.

37. A computer system according to claim 36 wherein the means for operating the master processor is a second micro-engine in the master processor.

38. A computer system according to claim 37 wherein the means for delivering a signal is a third micro-engine in the master processor.

39. A computer system according to claim 38 wherein the first buffer is a two opcode deep buffer.

40. A computer system according to claim 39 wherein the second buffer is a one instruction deep buffer holding an opcode and a set of three operands.

* * * * *